(12) United States Patent
Baker et al.

(10) Patent No.: US 8,438,465 B2
(45) Date of Patent: May 7, 2013

(54) PRIVILEGED COMMUNICATION SYSTEM WITH ROUTING CONTROLS

(75) Inventors: Stuart D. Baker, New York, NY (US); Philip C. Strassburger, Stamford, CT (US)

(73) Assignee: Purdue Pharma L.P., Stamford, CT (US)

( * ) Notice: Subject to any disclaimer, the term of this patent is extended or adjusted under 35 U.S.C. 154(b) by 2324 days.

(21) Appl. No.: 09/825,431

(22) Filed: Apr. 3, 2001

(65) Prior Publication Data

US 2004/0049696 A1 Mar. 11, 2004

(51) Int. Cl.
*G06F 17/00* (2006.01)

(52) U.S. Cl.
USPC .......................................................... 715/200

(58) Field of Classification Search .............. 715/500.1, 715/500, 501.1, 200; 713/188, 150; 709/202, 709/206; 726/11, 26, 28
See application file for complete search history.

(56) References Cited

U.S. PATENT DOCUMENTS

| | | | |
|---|---|---|---|
| 5,892,900 A | 4/1999 | Ginter et al. ................... 395/186 |
| 5,910,987 A | 6/1999 | Ginter et al. ..................... 380/24 |
| 5,915,019 A | 6/1999 | Ginter et al. ....................... 380/4 |
| 5,917,912 A | 6/1999 | Ginter et al. ..................... 380/24 |
| 5,949,876 A | 9/1999 | Ginter et al. ....................... 380/4 |
| 5,982,891 A | 11/1999 | Ginter et al. ....................... 380/4 |
| 6,014,688 A | 1/2000 | Venkatraman et al. ....... 709/206 |
| 6,092,201 A * | 7/2000 | Turnbull et al. .................... 726/4 |
| 6,122,632 A * | 9/2000 | Botts et al. ....................... 707/10 |
| 6,185,683 B1 | 2/2001 | Ginter et al. ................... 713/176 |
| 6,192,407 B1 | 2/2001 | Smith et al. .................... 709/229 |
| 6,237,786 B1 | 5/2001 | Ginter et al. ................... 213/153 |
| 6,253,193 B1 | 6/2001 | Ginter et al. ..................... 705/57 |
| 6,263,340 B1 | 7/2001 | Green ............................ 707/102 |
| 6,289,462 B1 | 9/2001 | McNabb et al. .............. 713/201 |
| 6,314,409 B2 | 11/2001 | Schneck et al. .................. 705/54 |
| 6,324,551 B1 | 11/2001 | Lamping et al. .............. 707/500 |
| 6,351,763 B1 | 2/2002 | Kawanaka ..................... 709/206 |
| 6,760,752 B1 * | 7/2004 | Liu et al. ........................ 709/206 |
| 7,240,199 B2 * | 7/2007 | Tomkow ........................ 713/168 |
| 2002/0087619 A1 * | 7/2002 | Tripathi ......................... 709/202 |
| 2002/0120869 A1 * | 8/2002 | Engstrom ...................... 713/201 |
| 2003/0196098 A1 * | 10/2003 | Dickinson et al. ............ 713/188 |
| 2004/0168079 A1 * | 8/2004 | Motoyama et al. ........... 713/200 |
| 2008/0140578 A1 * | 6/2008 | Felt et al. ......................... 705/71 |

FOREIGN PATENT DOCUMENTS

| | | |
|---|---|---|
| JP | 09252318 | 9/1997 |
| JP | 10133972 | 5/1998 |
| JP | 2000113066 | 4/2000 |
| JP | 2000231523 | 8/2000 |
| JP | 20000286884 | 10/2000 |
| JP | 2001056797 | 2/2001 |

OTHER PUBLICATIONS

Nishimura, Hiroshi, Nikkei Personal Computer, "Encrypted E-mail which can used by anybody to keep privacy from a peep," vol. 344, p. 150-159 by Nikkei BP Inc., published on Sep. 6, 1999.

* cited by examiner

*Primary Examiner* — Doug Hutton, Jr.
(74) *Attorney, Agent, or Firm* — Davidson, Davidson & Kappel, LLC (57) ABSTRACT

A privileged e-mail system is provided whereby a privilege attribute for a privileged e-mail is created containing a list of privileged recipients that may access the e-mail. The profile further includes particular access rights for each of the recipients defining what each recipient may do with respect to the privileged e-mail. Access to the contents of the privileged e-mail, including attachments to the e-mail, is managed by software that enforces the access rights granted in the privilege profile.

49 Claims, 2 Drawing Sheets

PRIVILEGED COMMUNICATION SYSTEM WITH ROUTING CONTROLS

FIELD OF THE INVENTION

The present invention relates to the field of electronically created documents, including electronic mail ("e-mail") messaging, and to the field of e-mail routing.

BACKGROUND OF THE INVENTION

E-mail messaging systems are widely used by businesses and individuals throughout the world allowing for the exchange of electronic messages between users. An e-mail system can be configured to provide messaging services to users connected to a local area network (LAN), and can be configured to allow users to send/receive messages to/from users outside the LAN via an external network wide are network (WAN), such as the Internet. E-mail systems also allow users to save, copy, and forward messages received over the e-mail system.

E-mail communications have been the subject of much debate as to whether the attorney-client privilege applies. The legal requirement for establishing privilege for e-mail communications varies from jurisdiction to jurisdiction, but the general rule is that privilege attaches when the parties intend that the communication is confidential and furthers the legal representation of the client. There is much debate and no clear indication, however, as to what evidences an intent to maintain confidentiality in e-mail communications because of the nature of the communication. During transmission to its destination, e-mails travel over various hardware belonging to various parties. Any communication to a party outside the legal representation relationship threatens a loss of the privilege for the content of the communication if an intent to maintain confidentiality is not found.

SUMMARY OF THE INVENTION

In accordance with a first embodiment of the present invention, a digital communication system is provided which includes a processor (such as a CPU) and a memory containing a program executable by the processor to attach a confidential attribute to a digital communication, restrict access to the confidential digital communication to an intended recipient, and store the privileged digital communication in a segregated location on a data storage device. In accordance with further aspects of this embodiment, the processor may restrict access to the privileged digital communication to an intended recipient and pre-registered designees of the intended recipient. Preferably, the confidential attribute is a privileged attribute, and the confidential digital communication is an attorney-client privileged communication. In accordance with still further aspects of this embodiment, the processor may restrict access to such a privileged digital communication to an intended recipient and pre-registered designees of attorney recipients.

In accordance with a second embodiment of the present invention, a digital communication system to denote confidentiality of a digital communication is provided which comprises: a processor and a memory containing a program executable by the CPU to attach confidential (and preferably privileged) attribute to a digital communication, create a confidential (and preferably privileged) distribution list of at least one intended recipient; restrict access to the privileged digital communication to the at least one intended recipient; restrict routing of the privileged digital communication to the at least one intended recipient; and store the confidential (and preferably privileged) digital communication in a segregated location on a data storage device.

In accordance with a third embodiment of the present invention, a method for creating an attorney-client privileged digital communication is provided which includes the steps of: creating an electronic communication; marking the communication privileged with a privileged attribute; storing the communication in a segregated location on a data storage device; configuring access rights to the digital communication; and, enforcing said access rights by managing access to the digital communication and controlling the manipulation of its contents. In accordance with this embodiment, the access rights include forwarding of the communication; replying; and replying with copies to pre-selected recipients.

In accordance with a fourth embodiment of the present invention, a digital communication system for denoting confidentiality of a digital communication comprises a processor and a memory containing a program executable by the CPU to attach an executable module to a digital communication, the executable module constructed and arranged to: create a confidential (and preferably privileged) distribution list of intended recipients of the digital communication; and restrict access to the digital communication to the intended recipients. Preferably, the executable module is constructed and arranged to also restrict routing of the digital communication to the intended recipients. In accordance with certain further aspects of this embodiment, the processor may restrict routing and/or access to the privileged digital communication to an intended recipient and pre-registered designees of the intended recipient. Preferably, the confidential attribute is a privileged attribute, and the confidential digital communication is an attorney-client privileged communication. In accordance with still further aspects of this embodiment, the processor may restrict access and/or routing to such a privileged digital communication to an intended recipient and pre-registered designees of attorney recipients.

In accordance with a fifth embodiment of the present invention, a method for creating a digital communication protected by privilege comprising the steps of: creating an executable module constructed and arranged to instruct a computer to restrict access to the communication to which the executable module is attached in order to maintain the application of the privilege; and attaching the executable module to the communication. In accordance with further aspects of this embodiment, the executable module is constructed and arranged to manage manipulation of the contents of the communication.

In accordance with a sixth embodiment of the present invention, a digital communication system to denote confidentiality of a digital communication comprises a processor and a memory operably connected to the processor, the memory containing a program including: a container creator utility to create a virtual container and place a privileged digital communication in the container; and a container opener utility to open the virtual container and remove the privileged digital communication.

In accordance with further aspects of the sixth embodiment, the container creator utility may be operable to create a virtual container which resides in contiguous locations in an electronic storage media of a computer, the virtual container including a header portion and a digital object portion. In this regard, the container creator utility may also be operable to select a digital object for insertion into the virtual container, applying an encryption technique to the digital object to create an encrypted digital object; write the encrypted digital object into the digital object portion, and configure a privilege profile for the digital object and write information indicative of the privilege profile into the header portion of the virtual container. The privilege profile preferably contains a list of intended recipients and the actions each one of the intended recipients may take on the digital object.

In accordance with still further aspects of the sixth embodiment, the container opener utility reads information indicative of the privilege profile from a header portion of a virtual container, determines, based upon said information, if a user is privileged to access contents of the digital object and to manipulate the contents as defined by the privilege profile; restrict access to the object if the user is not privileged; and read the digital object from the digital object portion and applying a decryption technique to the digital object if the user is privileged.

DETAILED DESCRIPTION OF THE PREFERRED EMBODIMENTS

An e-mail system according to the present invention allows users to show a definite intent to maintain confidentiality in an electronic form of communication by attaching a "privileged" or "confidential" attribute to the communication thereby deliberately and knowingly classifying the communication as privileged or confidential.

In particularly preferred embodiments of the present invention, the attribute is an "attorney client privilege" attribute. It is believed that these embodiments are particularly advantageous in view of the widespread use of e-mail for attorney client communications, and the importance of not only maintaining the privilege, but also of being able to establish (e.g., in a trial or arbitration) that the privilege was maintained.

However, the present invention is also applicable to other situations in which it is important to maintain confidentiality. For example, a corporation may wish to ensure that its corporate confidential information is transmitted only to employees who have a business reason to receive it. Doctors, for example, may wish to ensure that doctor-patient privilege is maintained in communications with patients. The clergy may have an interest in maintaining clergy privilege. Other applications are similarly encompassed by the present invention. Therefore, while the present invention is described below with respect to attorney-client privilege, it should be appreciated that the invention is also applicable to other privileges or to any situation in which it is important to maintain confidentiality of an e-mail communication.

In accordance with an embodiment of the present invention, a privileged e-mail system is provided whereby e-mail communications are assigned a "privileged" attribute when created, thereby evidencing an intent to maintain confidentiality and an intent to further legal representation in the e-mail. A privileged distribution list of e-mail addresses is created from the list of original recipients in the e-mail. Each user in the privileged distribution list is granted specific limited rights to access and manipulate the privileged e-mail to prevent forwarding to an unintended recipient, avoiding dissemination of the privileged information to someone not covered under the attorney-client privilege, and thereby preventing loss of protection under the privilege. Attachments to e-mails under the present invention may also be subject to control under the system. In addition, a confidentiality notice (and preferably a privileged and confidential notice) is displayed each time a privileged e-mail is accessed.

In accordance with a further aspect of the invention, an activity log is maintained for each privileged e-mail with an audit trail detailing each and every action taken on the e-mail.

In a first embodiment of the present invention, a server software object on a mail server stores privileged e-mails in a segregated location on a server. E-mails are created on an e-mail enabled client device by a client software object that sends privileged e-mails to the server object with a flag that identifies the e-mail as privileged. The server object recognizes the flag and stores the privileged e-mail in a segregated location on a storage device, separately from other, non-privileged e-mails.

The privileged distribution list, together with the rights and the activity log comprise a privilege profile for each e-mail.

Computer viruses are well known. Generally, a computer virus is a portion of executable code or program which attaches itself to a host file. For example, "appending viruses" operate by attaching themselves to the end of a host program and causing the host program to execute the virus code prior to execution of the host program. In contrast "prepending viruses" attach themselves to the beginning of the host program. Other types of viruses are located in interior portions of the host program. Other classes of viruses are known as "macro" viruses. These viruses are macros embedded in text e-mails which can be configured to execute whenever the e-mail is opened, created, or saved. Typically, the term Trojan horse is used to refer to a virus which remains with its host file or program, and does not travel to other files or programs.

In accordance with a second embodiment of the present invention, the system attaches an executable module in the form of a Trojan horse to an e-mail and any attachments when the privileged attribute is activated. The executable module contains a portion of executable code or an executable program that executes each time an e-mail to which it is attached is opened to restrict access and forwarding of the e-mail to users in the privileged distribution list. Since the executable module is attached to the e-mail, it will travel with the e-mail even when forwarded.

In accordance with a further aspect of the second embodiment of the invention, the executable module is attached automatically to all e-mails according to predetermined selection criteria.

In accordance with a still further aspect of the first and second embodiments, the e-mail, its contents, and its distribution list can be secured against a user who wishes to subvert the privileged system through the use of encryption technology. Specifically the e-mail message is encrypted, either by the executable module or by another utility, and the executable module is configured to decrypt the e-mail message only if the system allows decryption for the particular user. In this manner, if a user attempts to open a privileged e-mail without decryption by the system, the contents of the e-mail will be unreadable.

In accordance with a third embodiment of the present invention, a privileged e-mail system includes a virtual container into which one or more e-mails are "placed."

The system includes a container creator and a container opener. The container creator and the container opener are implemented in one or more software programs that are executed on a computer. All access to e-mail messages in a container go through the container opener. Access to an e-mail and its attachments is granted only when the user requesting access is in the privileged distribution list of the privileged e-mail.

In accordance with a further aspect of the third embodiment of the present invention, each e-mail in the container may have independent privileged distribution lists. In accordance with this feature, each e-mail in the container may have a different set of privileged users that can receive and forward the e-mail.

In accordance with a still further aspect of this embodiment, the e-mail and its privilege profile are encrypted. Specifically, the container creator is configured to encrypt the e-mails within the container, and the container opener is configured to decrypt the e-mail messages. In this manner, if a user opens one of the e-mails without utilizing the container opener, the contents of the e-mail will be unreadable.

In accordance with another embodiment of the present invention, a privileged e-mail is created by embedding a plurality of executable modules into the e-mail message, wherein each module is executable by a different e-mail system. For example, an e-mail could include a first module which is executable by a first system and a second module which is executable by a second system. The e-mail itself could be native to either system. In accordance with this embodiment, the access controls for the e-mail will be enforced regardless of whether it is opened in the first system or the second system.

Figure 1:
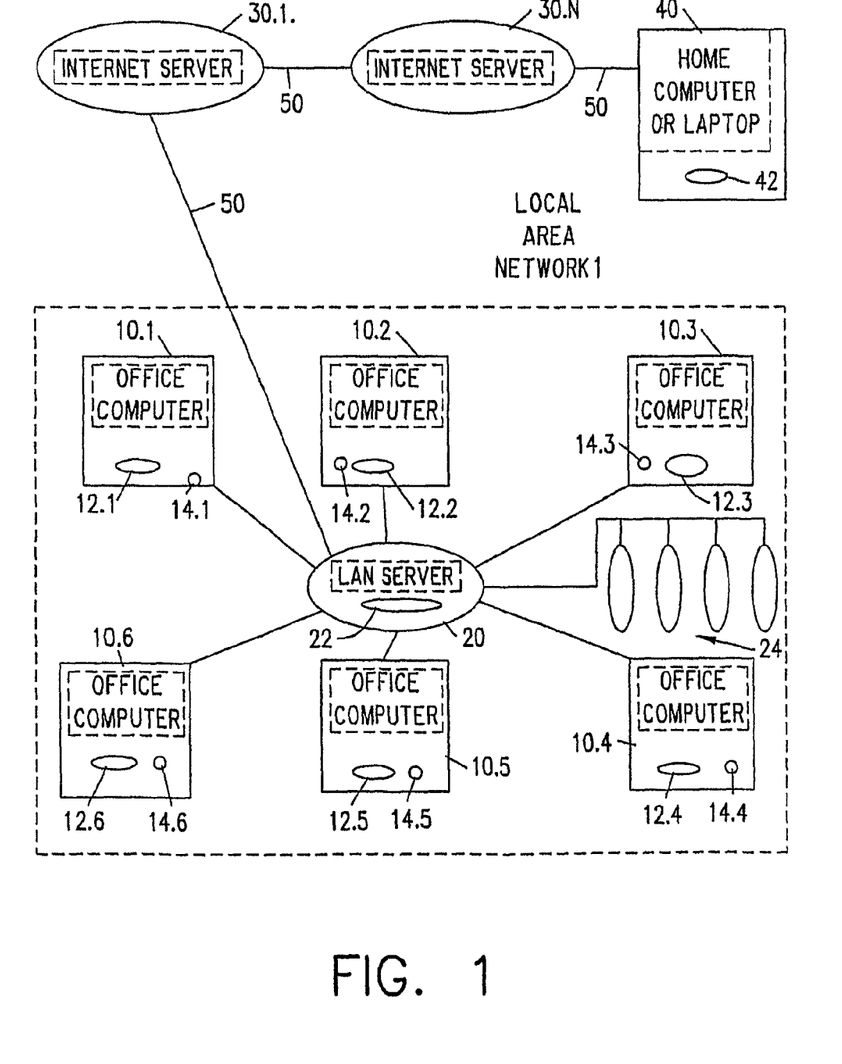
FIG. 1 shows an illustrative prior art environment in which the present invention can be implemented.

FIG. 1 shows an illustrative prior art environment in which the present invention can be utilized. A local area network 1 (LAN 1) includes a plurality of office computers 10.1-10.6 (hereinafter referred to collectively as computers 10) and a server 20. Each computer 10 includes a respective primary storage facility 12 (such as a hard drive) and a respective secondary storage facility 14 (such as a floppy disk or CD Rom drive). The server 20 similarly includes a primary network storage facility 22 (such as a hard drive) and a secondary network storage facility 24 (such as a tape or CD Rom drive). The data on the primary and secondary network storage facilities 22, 24 is shared in that it can be accessed by all of the computers 10. In contrast, the data on the primary and secondary storage facilities 12, 14 of each computer 10 is private in that it is accessed only by its respective computer 10. The server 20 provides Internet access to out-of-network computers, such as home computer 40, via transmission lines 50. Home computer 40 includes a primary storage facility 42 and a secondary storage facility 44. The LAN 1 supports an electronic mail messaging service which allows each computer 10 to send messages within the LAN 1 to other computers 10 and to send messages outside the LAN 1 to out of network computers such as home computer 40. The configuration shown in FIG. 1 is illustrative of typical LANs which are often used in businesses. As one of ordinary skill in the art will appreciate, however, the present invention may be implemented with a variety of network configurations. Moreover, the e-mail messaging system of the present invention is equally applicable to non-network applications in which, for example, e-mail messages are sent and received by a stand-alone computer via a modem or other connection. In addition, the features of the present invention may be implemented on a stand-alone computer, with or without a modem or other connection to external computers.

Some of the problems that can be alleviated in accordance with the present invention will now be explained with reference to the configuration of FIG. 1.

For example, assume user-1 creates an e-mail on computer 10.1 intended for user-2, who is in-house counsel. The e-mail is intended to further the legal representation of the company owning the LAN 1 so that the communication can qualify as privileged if there is sufficient evidence to show an intent to maintain confidentiality. Merely sending an ordinary e-mail on a privately-owned LAN may not be enough. Something more may be necessary depending on other circumstances surrounding the creation and transmission of the e-mail and the court deciding the question.

In the case where a message is forwarded outside the LAN to computer 40 via Internet servers 30, as is the case with e-mail communications to outside counsel, it is much more difficult to show an intent to maintain confidentiality because of the transfer of the e-mail message to different hardware owned by different parties. In addition, once the e-mail is sent, the creator, in this case user-1, has no control over who can access or distribute the contents of the e-mail or its attachments during transit. This is especially true when the Internet is involved in the path of the e-mail. There are few innate security measures within the Internet because it was built as an instrument for sharing information. When sending information across the Internet, the potential pool of eavesdroppers increases as unknown people at some distant data transfer point can access the information. Thus it is difficult to show the requisite intent when user-1 knows the nature of the Internet and uses e-mail regardless.

When creating an e-mail message with standard e-mail software, it is customary for the software to provide a number of attributes that can be attached to an e-mail. Typically, a graphical user interface (GUI) is provided with a number of buttons representing characteristics, functions, and attributes that may be attached to the e-mail. For example, an e-mail can be created with a return receipt, similar to a postal return receipt. When the recipient opens the e-mail, an e-mail notification is sent back to the sender to notify him that the e-mail was opened. In addition, e-mails may be sent with a low or high priority, messages may be flagged for follow-up or may be set for delivery at a later date. To select a specific attribute, its corresponding button is selected on the GUI with an input device, such as by clicking on the button with a mouse.

To configure the recipients of the e-mail, the user fills in a text box in the GUI, entitled "To:", with a list of e-mail addresses for intended recipients. A "cc:" box is also provided for recipients of copies, and a line for the subject of the e-mail as well. The user then writes the body of the e-mail, attaches digital documents, if he wishes, selects any attributes intended for the e-mail, and sends the e-mail by clicking on a "Send" button in the GUI. The e-mail and any attachments are sent to the mail server before being routed to its intended recipients.

In an e-mail system according to the present invention, a "Privileged" box is provided in the GUI for creating a new e-mail. When the "Privileged" box is selected, the users in the "To:" box form a privileged distribution list of e-mail addresses. The privileged distribution list may, for example, include e-mail addresses of the attorneys at a specific law firm or legal department. The recipients in the e-mail addresses are the only allowed destinations for the privileged e-mail and should only include parties covered under the attorney-client privilege. In effect, restricted forwarding is provided so that a privileged e-mail does not go beyond its intended recipients, thus maintaining the privilege.

In a further aspect of the present invention, the creator of the e-mail grants specific access rights to recipients of the e-mail. An "Access Rights" window or tool menu, is provided to configure the access rights of each privileged e-mail. In the window, the privileged distribution list of intended recipients is presented to the user for review and modification. If no modification is necessary, the user verifies the distribution list and grants specific access rights to each recipient for manipulating the e-mail in a specific way as determined by the creator of the e-mail.

For example, access rights may include forwarding, copying, and cut and paste. Replying and copy on replies is always inherently granted, however, the recipients for replying are selected from the distribution list via a pull-down menu to maintain restricted forwarding. Forwarding rights allow a user to forward the e-mail to specific users determined by the creator of the e-mail. When the recipient forwards a privileged e-mail, the system provides the privileged distribution list for choosing forwarding recipients. For example, an attorney sending an e-mail to a high level executive would grant the executive forwarding rights to his employees, so that the executive may decide who the e-mail should be forwarded to subject to the constraint originally imposed by the attorney to limit forwarding within the executive's department. When the executive forwards the e-mail, the system does not allow him to enter e-mail addresses. Rather, the e-mail addresses are chosen from the privileged distribution list.

In accordance with a further aspect of this embodiment, users may be able to designate "automatic" forwarding recipients. For example, an attorney may wish for his assistant to automatically receive a copy of each e-mail the attorney receives. To effectuate this, the assistant could be pre-registered in the e-mail system as an automatic forwarding recipient of the attorney. In certain embodiments, this pre-registration and automatic forwarding could be completely transparent to the sender of the e-mail. In the case of attorney-client privilege communications, the system could limit the automatic forwarding feature to users who are registered as attorneys on the system.

In accordance with another aspect of the attorney-client privilege embodiments of the present invention, the system can refuse to transmit any e-mail message with a privileged attribute unless an attorney user is either in the "From" field or the "To" field.

Copying allows a user to make copies of the e-mail to a disk or other storage device. Cut-and-paste allows a user to cut and paste e-mail contents into other documents. Cut-and-paste should be selectively granted and preferably, is only granted to attorneys, high-level executives and those recipients whom the sender trusts because of the cut-and-paste ability to take privileged material out of the system's reach. Attachments to a privileged e-mail are also subject to control under system access rights.

After the access rights are configured, a corresponding privilege profile is created containing the privileged distribution list, the access rights for each recipient in the list, and any other information unique to that e-mail, such as a password for modification of the distribution list and access rights. The profile may be packaged with the e-mail or created and stored separately from the e-mail on a central server. When the user clicks on "Send", the e-mail is sent to a mail server.

For example, assume user-1 creates an e-mail with a distribution list including user-2 and user-3 in the "To:" text box. User-1 grants user-2 forwarding rights to all addresses in the privileged distribution list, and user-3 no rights. A privileged distribution list is created by the system including user-2 with the right to forward the e-mail and user-3 with no rights other than the right to view the e-mail, which is always inherently granted. In this case, user-2 may reply to user-1 and send a copy to user-3 because user-3 is in the privileged list and is therefore privileged to receive replies. User-2 may not, however, forward the e-mail or anything related to the e-mail, such as replies, to user-4 because user-4 has no rights for this particular e-mail. User-3 may reply to user-1, but may not forward the e-mail, or its replies to any user because user-3 has no rights at all.

Alternatively, privileged distribution lists and access rights can be created and configured automatically by the system according to some pre-determined criteria set by an administrative entity. In-house counsel for a large company, for example, may create a confidentiality policy to ensure the application of the attorney-client privilege to certain documents, such as making all incoming and outgoing e-mails from the legal department privileged under the system with certain rights. Rights may further be granted individually, by position, or by departments in a company. The president of a company may be granted all rights, the vice presidents forwarding and copying, the managers forwarding, and employees, no granted rights (reading and replying). Routing of e-mails may also be limited to a group, department or corporation.

After an e-mail is created, it may be desirable to modify the privilege profile. To this end, a unique password can be created for each privileged e-mail. The password is issued to whoever creates the privileged profile of the e-mail. When the system configures e-mail privilege profiles, an administrative entity will have access to a master password for modification of all e-mails created under the system. Alternatively, the master password can grant access to a password database maintained by the system. Every time an e-mail is created by the system, its unique password is recorded in a database and associated with an e-mail ID. To modify the privilege profile of a particular e-mail, an administrator of the system uses the master password and the e-mail's ID to access the database and retrieve the unique password assigned to the particular e-mail to modify the privilege profile.

In addition, the system automatically includes a confidentiality notice with each e-mail. The notice is displayed each time the e-mail is opened to put the person viewing the e-mail on notice that the communication is intended to be confidential and that only the intended recipients may read the e-mail. Preferably, the contents of the e-mail are not displayed until the user clicks on a box agreeing to the confidentiality notice. Thus, the intent to maintain confidentiality is further evidenced because in the event a user viewing the e-mail is not one of the intended recipients, it cannot be inferred that the creator of the e-mail intended that someone outside the privileged relationship have access to the privileged information. An exemplary notice is as follows,

THIS COMMUNICATION IS PRIVILEGED AND CONFIDENTIAL

This e-mail, and any attachment(s) hereto, is intended only for use by the addressee(s) named herein. If you are not the intended recipient of this e-mail, you are hereby notified that any reading, dissemination, distribution or copying of this e-mail, and any attachments hereto, is strictly prohibited. If you have received this e-mail in error, please immediately notify the sender and permanently delete the original and any copy of any e-mail and any printout thereof.

In addition, an audit trail file is created for each privileged e-mail to keep track of all actions taken on the e-mail. The audit file is updated every time an e-mail is accessed. The file maintains a record of every action taken on the e-mail, such as opening, forwarding, copying, replying, carbon copy replies and cut and paste.

The privileged distribution list with access rights comprises the privilege profile of a privileged e-mail. The profile contains all information related to the privileged condition of the privileged e-mail, i.e., the privileged distribution lists and rights granted to each user. The profile may be created and maintained separately from the e-mail or packaged with the e-mail.

For added security, privileged e-mails and their profiles can be encrypted by the system before transmission over public communication lines.

The above functionalities of the present invention provides proof that precautions were taken to prevent inadvertent disclosure and maintain confidentiality to preserve the application of the attorney-client privilege to a communication.

Figure 2:
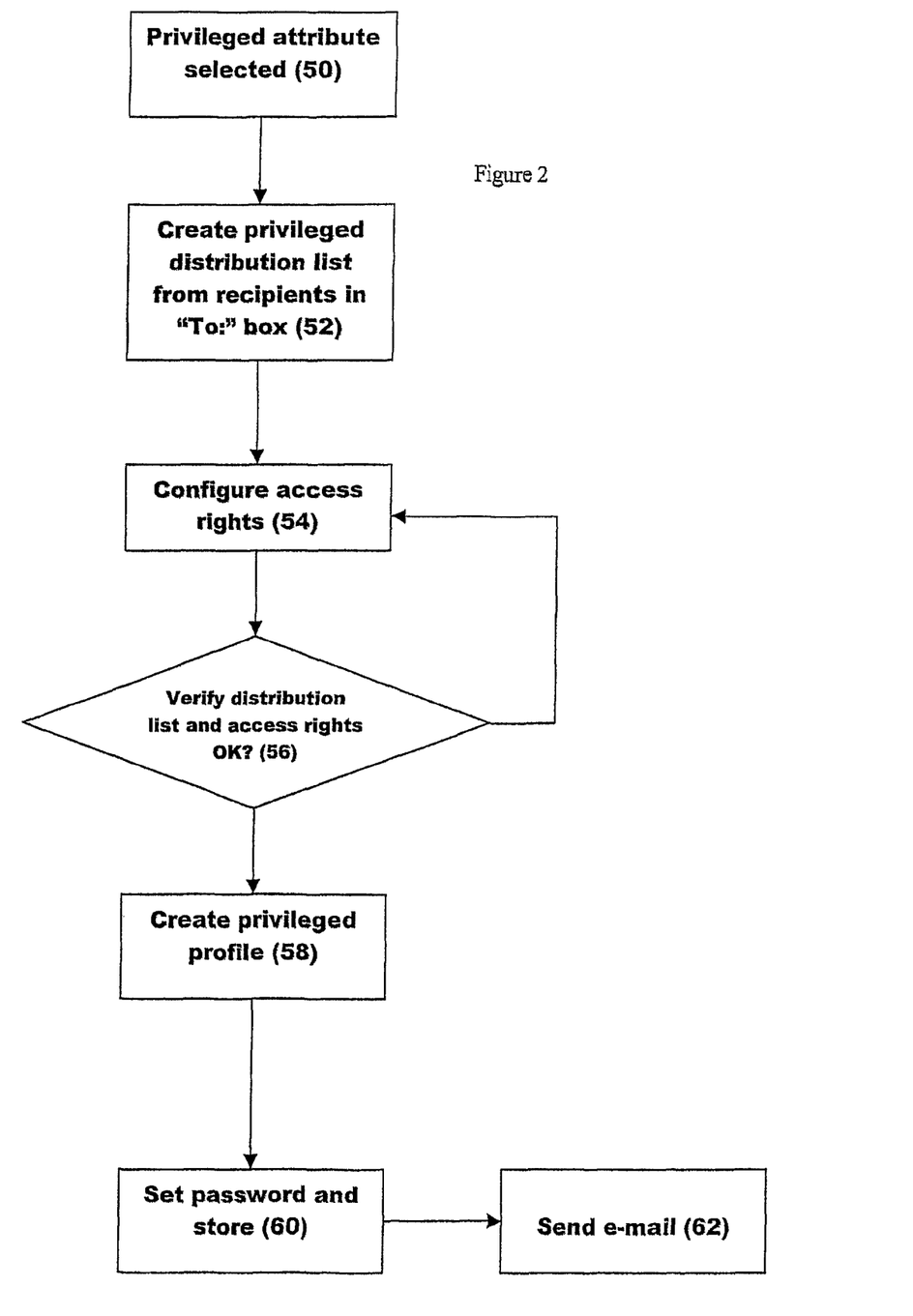
FIG. 2 depicts a flowchart for the steps involved in creating a privileged e-mail in accordance with the present invention.

The process of creating a privileged e-mail is shown in FIG. 2. When a user selects the "Privileged" condition (step 50), the system creates a privileged distribution list from the recipient e-mail addresses in the "To:" text box (step 52). The access rights are configured (step 54) and then presented to the user for verification (step 56). If there is a need for correction of the distribution list or the access rights, the user is returned to configuring the access rights (step 54). If the distribution list and access rights are correct, the system creates the privilege profile for the e-mail (step 58). A unique password is generated and stored on some central data storage device (step 60). The e-mail is packaged and sent (step 62).

Alternatively, an e-mail that was not originally created as a privileged e-mail can be accorded such status by a recipient. When a recipient, such as corporate counsel, receives an e-mail that was not given the privileged condition upon creation, but decides that it should be privileged, he can make the e-mail privileged before further dissemination. In addition, the system can be configured to notify the originator of the e-mail, as well as its original recipients of the new, privileged condition. Further, the original e-mail is taken from the server, deleted from its original storage place in memory, and relocated into the segregated storage location for privileged e-mails.

Server-Based Privileged E-Mail System

The first embodiment of the present invention includes a client software object residing on a client device and a server software object residing on a mail server. The two objects communicate over a network connection as is generally known. The client object provides the GUI for interacting with the user to create the privileged e-mails and their corresponding profiles. The client object also transmits e-mails to the mail server with their corresponding privilege profiles, and performs encryption and decryption when necessary. The server object maintains the privileged e-mails in a segregated location on the server's data storage device, controls access to the privileged e-mails and manages encryption keys when encryption is used.

The objects may be designed under any type of software architecture and the use of the term "object" is not meant to limit the system to implementation under an object-oriented programming language.

The client object may be a plug-in for a pre-existing e-mail platform or the client version of an e-mail software package according to the present invention. The plug-in is installed and added onto a pre-existing e-mail system, such as Microsoft Outlook or Lotus Notes. The plug-in, when installed, will add the "Privileged" button onto the preexisting GUI so that when the button is clicked, the system plug-in interacts with the user to create the e-mail and the privilege profile and transmit the e-mail to the system server with the profile and any attachments.

The recipient of a privileged e-mail should have the plug-in as well to communicate with the server and download privileged e-mails. The recipient's client object displays the e-mail with the necessary confidentiality notices and performs decryption. The client object may also enforce the privilege profile at the receiving end.

When a user selects the privileged attribute and creates a privileged e-mail, it is flagged by the client object and sent to the server so that the server object detects the privileged condition and stores the privileged e-mail in a segregated location, such as a "privileged" folder on its storage device, before transmitting the e-mail to the recipient. Preferably, all copies, and associated documents to privileged e-mails, such as attachments, are stored in the same location.

In an alternative embodiment, the segregated location resides on a different server other than the mail server used for routing of the e-mail. In this embodiment, a copy of each e-mail is sent to the segregated server, i.e., the server housing the segregated location. This can be implemented, for example, by sending a blind carbon copy (bcc) to the segregated server whenever a privileged e-mail is sent. This embodiment is particularly useful when the originators of the privileged communication are using a stand-alone client computer which sends e-mail directly over the Internet without the use of a dedicated e-mail server.

In accordance with yet another embodiment, a segregated location exists on the computer which originates the e-mail message to store copies of all privileged e-mails sent by the computer. This can be provided separately from, or in combination with, the segregated server embodiment discussed above.

The segregated location may be configured in a number of ways. E-mails may be grouped by sender, recipient, department of a corporation, area of law, or by any other classification based on a common characteristic the privileged e-mails may have.

Certain administrative entities may be given access to the entire segregated location as a whole. Access may be controlled by a master password or granted by network status, i.e., administrators only.

The server object creates an audit file for each privileged e-mail when received. The server maintains a log of every request to access and every action take on the e-mail in the corresponding audit file for each e-mail. When a privileged e-mail is sent to an authorized client object, a copy of the audit trail file is sent with it for updating with all actions taken on the e-mail by the client object.

If encryption is used, it is preferably done by the client object so that the e-mail is encrypted when in transit. The keys for each e-mail can be stored in the corresponding privilege profile for each e-mail, or at the server. If maintained on the server, the key itself can be encrypted before being sent with its corresponding e-mail.

Once an e-mail is created and sent to the server, it resides on the server's data storage device to be picked up by the recipient.

When an e-mail is sent to the server object, the server accesses its corresponding privilege profile to determine the recipients of the e-mail and send a notification to the corresponding client objects on the recipients' e-mail devices. The notification is provided to the user by the client object through the GUI for the e-mail system. The user selects an icon for viewing new mail and a summary of the e-mail in his account is shown with some graphical marking to represent the privileged condition. If the user wants to view the e-mail, he clicks on its corresponding graphical representation icon. The client object sends a requests to access the privileged e-mail to the server object. When the server receives the request, it checks the source of the request, accesses the particular e-mail, checks the privilege profile and determines if access should be granted. If access should not be granted, the user is notified that he does not have rights to the e-mail. If the user is one of the privileged users in the distribution list, the e-mail is sent to the client object with the privilege profile and audit trail.

Alternatively, the client object can interact with the server object to display the e-mail without downloading the contents of the e-mail to the client device. The client object can be used to view the e-mail on the server object over a network connection, as is well-known. The server object accepts requests from the client object to take action on the e-mail such as viewing, forwarding, copying and any other action that may be taken on the e-mail.

Actions taken on the e-mail go through the system objects so that any unauthorized actions can be prevented by managing manipulation of the e-mail's contents, including attachments. To access or take action on an e-mail, a request is issued to a system object (e.g., the client object or the server object, depending on how the system is configured). The system object accesses the particular requested e-mail and reads its corresponding privilege profile to verify that the user requesting access is privileged. If the requesting user is privileged, the requested action, such as forwarding or copying is allowed.

Before displaying the contents of the e-mail, it is desirable to display the confidentiality notice and require acknowledgment of the notice by some user action, such as clicking on an "OK" button. If the user fails to acknowledge the confidentiality notice, access is denied, the user is notified and the client object closes the e-mail. The client object may further send notification to the server that the recipient has refused to acknowledge the confidential nature of the e-mail. The server object, in turn, notifies the creator of the e-mail.

If the recipient agrees to the confidentiality notice, the client object reads the e-mail's privilege profile and displays the e-mail to the user via the system GUI. All actions taken on the e-mail are done through the client object. For example, if the user replies to the e-mail with carbon copies, the recipients of the copies are chosen from the privileged distribution list to prevent the e-mail from being sent to a recipient outside the privileged relationship. Forwarding of the e-mail is done the same way, recipients are chosen from a menu of the privileged recipients rather than typing recipients in the "To:" box.

In accordance with an alternate embodiment of the server-based system, a central server can store all e-mails under the system with an interface for each kind of e-mail platform, i.e., Lotus Notes, Microsoft Outlook.

Executable Modules Embedded in the E-Mail Message

In accordance with a second embodiment of the present invention, a privileged e-mail system is provided which attaches an executable module to an e-mail as disclosed in WO 98/58321 entitled "Self-Destructing Document and E-mail Messaging System", hereby incorporated by reference in its entirety.

The second embodiment can be implemented on a pre-existing e-mail system by a software object, which is preferably a plug-in that resides on the client devices of the e-mail system. The object stands alone and does not work directly with a server version. There is also no need for communication between the objects of the invention in this embodiment. Additionally, it is not necessary for the recipient to have the system plug-in because the attached executable should be platform independent so that it can execute regardless of the user's operating system on his e-mail enabled device.

When installed and added onto an existing e-mail package, the plug-in object adds the GUI for the system onto the existing e-mail software interface. The "privileged" box is inserted into the pre-existing window for creating a new e-mail. When a user creates a new e-mail and selects the privileged attribute, as previously discussed, the plug-in takes over and displays the system GUIs for configuring the e-mail's privilege profile.

When the user sends the e-mail, the plug-in creates an executable module programmed to enforce the access rights and distribution in the profile, namely, granting access and rights only to those specified in the profile. The audit trail file is also included with the executable as well as modification functionality with its corresponding password. The e-mail is sent as it normally is by the pre-existing system and resides on the system's server until picked up by the recipient.

When the recipient opens the e-mail the module executes to provide an interface for the user to read the e-mail. Requests to access or otherwise take action on the e-mail go through the executable module. The privilege profile is accessed for every request to verify that the action is permitted by the privilege profile. If a restricted action is attempted, the user is notified of the restriction and the executable module closed the e-mail. When a permitted action is requested, the confidentiality notice is displayed, and once acknowledged, the module performs the requested action, which may be viewing, forwarding or copying the e-mail or any other action permitted by the profile.

When forwarding a privileged e-mail with an attached executable to multiple recipients from a client device that does not have the system plug-in, the module itself will create another executable module to attach to each of the forwarded e-mails.

The attached executable module restricts access to and forwarding of the e-mail. Moreover, the executable modules in accordance with the privileged e-mails set forth above can also utilize encryption techniques to prevent a user from defeating the access controls, for example, by opening a privileged e-mail with an application which is incapable of executing the executable module that restricts access and forwarding. In accordance with such an embodiment, when an e-mail is first saved or closed, the executable module will encrypt the e-mail. Then, when the e-mail is subsequently opened, the executable module will decrypt the e-mail only if the user has access under the access controls. Moreover, if the e-mail is opened with an application which is incapable of executing the executable module, then the e-mail will remain encrypted, and the user will be unable to view the e-mail. The selection of an appropriate encryption technique would be dependent on the degree of security desired, and the ability of the macro or script used to implement it.

To ensure functionality across different platforms, a plurality of executable modules can be attached to the e-mail, wherein each module is executable by a different e-mail system. For example, an e-mail could include a first module which is executable by a first system and a second module which is executable by a second system. The e-mail itself could be native to either system. In accordance with this embodiment, the privilege profile for the e-mail will be enforced regardless of whether it is opened in the first system or the second system.

Virtual Containers

In accordance with the third embodiment of the present invention, e-mails are placed in virtual containers as disclosed in WO 98/58321 "Self-Destructing Document and E-mail Messaging System", hereby incorporated by reference in its entirety.

This embodiment is also preferably implemented with a plug-in for a preexisting e-mail system. The plug-in comprises the container creator and container opener utilities as well as the system GUI for interfacing with the user.

The plug-in interacts with the user through the pre-existing GUI as discussed above to create privileged e-mails. Access rights are configured and organized into a privilege profile as previously discussed and "placed" in a virtual container with the privileged e-mail. The container creator utility creates the container, places the e-mail and its privilege profile into the container, with any other pertinent information, like the modification password. The e-mail is then sent by the pre-existing system to the privileged recipients as it would normally be sent.

When a recipient opens the privileged e-mail, the container opener verifies the authority of the recipient to access the privileged e-mail. If the request to access the e-mail is coming from a user having an e-mail address in the privileged distribution list, the container opener will extract the e-mail and display it through the system GUI with the confidentiality notice. If, however, the user is not privileged to access the e-mail, the container opener will deny access to the e-mail application. In this way, the container opener utility enforces the privilege profile and handles all requests to access or otherwise take action on e-mails its corresponding container. The container opener can be attached to the container as an executable module in accordance with the previous embodiment, or installed on a client device as a plug-in to the e-mail software.

If the user attempting to access the e-mail is in the privileged distribution list, the system reads from the profile, the rights granted to that user before allowing the user to access the e-mail. If the user is not in the privileged list, access is denied and the user is notified that he does not have access to the e-mail.

In any of the above embodiments, the system only allows the user to act on the e-mail in accordance with the rights granted to the user in the e-mail's privilege profile, thereby controlling any and all manipulation of the contents of the e-mail. If the user has rights to forward the e-mail, forwarding is allowed and executed by the system to privileged addressees only. Actions may be taken on the e-mail only when the user has the right. Any attempts to take action on the e-mail for which the user is not privileged will produce restriction and notification to the user. Preferably, when forwarding a privileged e-mail, the user may not enter destination e-mail addresses. A selection is made from a menu containing the distribution list.

The different embodiments of the present invention may be combined. The server-based embodiment may attach executable modules to any content taken out of the system's reach such as e-mails copied to disk or material that is cut and paste from a privileged e-mail. Alternatively, content taken out of the system's reach can be placed in virtual containers in accordance with the present invention.

In accordance with other embodiments of the present invention, computer readable media are provided which have stored thereon, the computer executable process steps described above with regard to the various embodiments of the present invention.

In the preceding specification, the invention has been described with reference to specific exemplary embodiments thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for creating a digital communication protected by privilege comprising the steps of:
    creating an executable module constructed and arranged to instruct a computer, according to a privileged distribution list associated with the digital communication when the digital communication was created, to restrict access to the communication to which the executable module is attached in order to maintain the application of the privilege;
    attaching the executable module to the communication, whereby the executable module instructs the computer to restrict access to the communication to recipients selected by the creator of the digital communication before the digital communication is sent.

2. The method of claim 1 further comprising:
    configuring access rights to the digital communication;
    enforcing said access rights by managing access to the digital communication and controlling the manipulation of its contents.

3. The method of claim 1 wherein the access rights include:
    forwarding the communication;
    replying; and
    replying with carbon copies to pre-selected recipients.

4. The method of claim 1 wherein the communication includes an address portion and a content portion, and wherein the access rights include:
    copying of the contents of the communication;
    cutting the contents of the communication out of the communication and pasting the cut out contents into another location.

5. The method of claim 1 further comprising creating a privilege profile, the profile containing the privileged distribution list and the access rights.

6. The method of claim 1 wherein the program is configured to execute automatically and attach the executable module to particular communications according to predetermined selection criteria.

7. The method of claim 1 further comprising displaying a confidentiality notice to a user and requiring that the confidentiality notice be acknowledged by the user before the privileged communication is displayed.

8. The method of claim 1 further comprising applying an encryption technique to the digital communication.

9. A method for creating a privileged digital document, comprising the steps of:
    creating an executable module which instructs a computer to maintain confidentiality in communication of the privileged digital document to which the executable module is attached by restricting access to the digital document and managing manipulation of its contents, according to a privileged distribution list created and associated with the digital document;
    attaching the executable module to the privileged digital document, whereby the executable module instructs the computer to restrict access to the privileged digital document to recipients selected by the creator of the privileged digital document before the privileged digital document is sent.

10. The method according to claim 9, further comprising the step of executing the executable module when the document is opened.

11. The method of claim 9, wherein the document is an encrypted document, and wherein the executable module is configured to instruct the computer to decrypt the document if a predetermined condition is met.

12. A digital communication system to comprising:
a first memory containing a program executable by a processor to:
attach a privileged attribute to a digital communication, the privileged attribute selected by the creator of the digital communication before the digital communication is sent;
a second memory containing a program executable by a processor to:
restrict access to the privileged digital communication to an intended recipient and pre-registered designees of attorney recipients in accordance with the privileged attribute; and
store the privileged digital communication in a segregated location for privileged digital communications on a data storage device.

13. A digital communication system comprising:
a processor; and
a memory containing a program executable by the processor to attach an executable module to a digital communication when the digital communication is created, the executable module constructed and arranged to:
restrict access to the digital communication to which it is attached to an intended recipient and pre-registered designees of attorney recipients selected by the creator of the digital communication before the digital communication is sent;
restrict routing of the digital communication to which it is attached to the intended recipient and pre-registered designees of attorney recipients.

14. A digital communication system to denote confidentiality of a digital communication comprising:
a first memory containing a program executable by a processor to:
attach a privileged attribute to a digital communication, when the privileged attribute selected by the creator of the digital communication before the digital communication is sent; and
create a privileged distribution list of at least one intended recipient and associate the privileged distribution list with the digital communication when the digital communication is created; and
a second memory containing a program executable by a processor to:
restrict access to the privileged digital communication to the at least one intended recipient according to the privileged distribution list;
restrict routing of the privileged digital communication to the intended recipients and prevent forwarding of the digital communication to an unintended recipient; and
store the privileged digital communication in a segregated location for privileged digital communications on a data storage device.,
wherein the intended recipients are selected by the creator of the digital communication before the digital communication is sent.

15. A method for creating an attorney-client privileged electronic communication comprising the steps of:
creating an electronic communication;
marking the electronic communication privileged with a privileged attribute which is selected by the creator of the electronic communication before the electronic communication is sent storing the electronic communication in a segregated location for privileged electronic communications on a data storage device;
configuring access rights to the electronic communication and associating a privileged distribution list with the digital communication and
enforcing said access rights by managing access to the electronic communication and controlling the manipulation of its contents based upon the privileged distribution list;
wherein the access rights include:
forwarding of the communication;
replying; and
replying with copies to pre-selected recipients.

16. The method of claim 15 wherein the communication includes an address portion and a content portion, and wherein the access rights include:
copying of the contents of the communication;
cutting the contents of the communication out of the communication and
pasting the cut out contents into another location.

17. The method of claim 15 further comprising automatically attaching the privileged attribute to particular communications according to pre-determined selection criteria.

18. The method of claim 15 further comprising:
displaying a confidentiality notice to a user; and, requiring acknowledgment by the user of the confidentiality notice before displaying the privileged communication.

19. The method of claim 15 further comprising applying an encryption technique to the digital communication.

20. The method of claim 15 further comprising the steps of:
creating a blind carbon copy of the digital communication;
sending the blind carbon copy to a segregated server wherein the segregated location resides on the segregated server.

21. The method of claim 15 further comprising dividing the segregated location by a common characteristic of the digital communication, the common characteristic including one or more of:
a sender of the digital communication;
a recipient of the digital communication; and
a department of a corporation.

22. The method of claim 15 further comprising the steps of:
creating a second segregated location on a client device;
storing a copy of the digital communication on the second segregated location for privileged digital communications.

23. A digital communication system for denoting confidentiality of a digital communication comprising:
a processor; and
a memory containing a program executable by the processor to attach an executable module to a digital communication when the digital communication is created, the executable module constructed and arranged to:
create a privileged distribution list of intended recipients of the digital communication to which it is attached when the digital communication is created;
restrict access to the digital communication to which it is attached to the intended recipients; and
restrict routing of the digital communication to which it is attached to the intended recipients and prevent forwarding of the digital communication to an unintended recipient, wherein the intended recipients are selected by the creator of the digital communication before the digital communication is.

24. The communication system of claim 23 wherein the program is further executable to configure access rights to the digital communication and to enforce said access rights by managing access to the digital communication and controlling the manipulation of its contents, wherein the access rights include:
 allowing forwarding of the communication;
 allowing replying; and
 allowing replying with carbon copies to pre-selected recipients.

25. The communication system of claim 23 wherein the communication includes an address portion and a content portion, and wherein the access rights further include:
 allowing copying of the contents of the communication;
 allowing cutting the contents of the communication out of the communication and pasting the cut out contents into another location.

26. The communication system of claim 23 wherein the program is configured to execute automatically and attach the executable module to particular communications according to predetermined selection criteria.

27. The communication system of claim 23 further comprising a confidentiality notice that is displayed to a user and acknowledged by the user before displaying the privileged communication.

28. The communication system of claim 23 wherein the privileged digital communication is encrypted.

29. The communication system of claim 28 wherein the client object is configured to attach the executable module, and send the privileged communication to the server object.

30. The communication system of claim 28 wherein the server object restricts access and routing of the digital communication and stores the communication in a segregated location.

31. The communication system of claim 28 wherein the client object is a plug-in to a pre-existing communication system.

32. The communication system of claim 23, wherein the program further comprises a server object and a client object.

33. The digital communication system of claim 14, wherein the privileged distribution list is created from the at least one intended recipient e-mail address in a "To" text box of the digital communication.

34. The communication system of claim 14, wherein the at least one intended recipient is a plurality of intended recipients.

35. The communication system of claim 14 further comprising:
 a mail server; and,
 a segregated server housing the segregated location for privileged digital communications;
 wherein the program is further executable to send a copy of the communication to the segregated server.

36. The communication system of claim 35, wherein the copy is sent as a blind carbon copy.

37. The communication system of claim 14 wherein the segregated location for privileged digital communications is divided by a common characteristic of the digital communication, the common characteristic including:
 a sender of the digital communication;
 a recipient of the digital communication; and, a department of a corporation using the system.

38. The communication system of claim 14 wherein the program is further executable to configure access rights to the digital communication and to enforce said access rights by managing access to the digital communication and controlling the manipulation of its contents.

39. The communication system of claim 38 wherein the access rights include:
 forwarding of the communication;
 replying; and
 replying with copies to pre-selected recipients.

40. The communication system of claim 38 wherein the communication includes an address portion and a content portion, and wherein the access rights further include:
 allowing copying of the contents of the communication; and
 allowing cutting the contents of the communication out of the communication and pasting the cut out contents into another location.

41. The communication system of claim 14 wherein the program is configured to execute automatically and attach the privileged attribute to particular communications according to predetermined selection criteria.

42. The communication system of claim 14 further comprising a confidentiality notice that is displayed to a user and acknowledged by the user before displaying the privileged communication.

43. The communication system of claim 42 wherein the user acknowledges the confidentiality notice by clicking on a GUI button.

44. The communication system of claim 14 wherein the privileged digital communication is encrypted.

45. The communication system of claim 14 wherein the program further comprises a server object and a client object.

46. The communication system of claim 45 wherein the client object is configured to attach the privileged attribute, create the privileged distribution list and send the privileged communication to the server object.

47. The communication system of claim 45 wherein the server object restricts access and routing of the digital communication and stores the communication in the segregated location.

48. The communication system of claim 45 wherein the client object is a plug-in to a pre-existing communication system.

49. The communication system of claim 14 further comprising a second segregated location residing on a client device.

* * * * *